US012280734B2

(12) United States Patent
Lee et al.

(10) Patent No.: US 12,280,734 B2
(45) Date of Patent: Apr. 22, 2025

(54) VEHICLE SEAT REINFORCEMENT DEVICE

(71) Applicants: Hyundai Motor Company, Seoul (KR); Kia Corporation, Seoul (KR); Daechang Seat Co.,LTD-Dongtan, Hwaseong-si (KR); Hyundai Transys Inc., Seosan-si (KR)

(72) Inventors: Sang Soo Lee, Hwaseong-Si (KR); Chan Ho Jung, Gunpo-Si (KR); Mu Young Kim, Osan-Si (KR); Sang Hark Lee, Incheon (KR); Ho Suk Jung, Hwaseong-Si (KR); Deok Soo Lim, Hwaseong-Si (KR); Sang Do Park, Suwon-Si (KR); In Sun Baek, Hwaseong-Si (KR); Sin Chan Yang, Hwaseong-Si (KR); Chan Ki Cho, Pyeongchang-Gun (KR); Myung Soo Lee, Osan-Si (KR); Jae Yong Jang, Suwon-Si (KR); Jun Sik Hwang, Hwaseong-Si (KR); Ho Sung Kang, Hwaseong-Si (KR); Hae Dong Kwak, Hwaseong-Si (KR); Hyun Tak Ko, Osan-Si (KR)

(73) Assignees: Hyundai Motor Company, Seoul (KR); Kia Corporation, Seoul (KR); Daechang Seat Co., LTD-Dongtan, Hwaseong-si (KR); Hyundai Transys Inc., Seosan-si (KR)

( * ) Notice: Subject to any disclaimer, the term of this patent is extended or adjusted under 35 U.S.C. 154(b) by 126 days.

(21) Appl. No.: 18/105,472

(22) Filed: Feb. 3, 2023

(65) Prior Publication Data

US 2024/0083384 A1    Mar. 14, 2024

(30) Foreign Application Priority Data

Sep. 14, 2022 (KR) ........................ 10-2022-0115759

(51) Int. Cl.
*B60N 2/42* (2006.01)
*B60N 2/427* (2006.01)
*B60R 22/26* (2006.01)

(52) U.S. Cl.
CPC ............ *B60R 22/26* (2013.01); *B60N 2/4228* (2013.01); *B60N 2/42736* (2013.01)

(58) Field of Classification Search
CPC .... B60N 2/4228; B60N 2/42736; B60R 22/26
USPC ......................................... 297/216.13–216.2
See application file for complete search history.

(56) References Cited

U.S. PATENT DOCUMENTS

| 3,897,101 | A | * | 7/1975 | Hess | ......................... | B60N 2/43 |
| | | | | | | 297/216.1 X |
| 4,262,963 | A | * | 4/1981 | Bauer | .................. | B60N 2/0732 |
| | | | | | | 296/65.14 |
| 4,784,434 | A | * | 11/1988 | Iwami | .................... | B60N 2/505 |
| | | | | | | 297/216.17 |

(Continued)

*Primary Examiner* — Rodney B White
(74) *Attorney, Agent, or Firm* — Morgan, Lewis & Bockius LLP (57) ABSTRACT

A vehicle seat reinforcement device includes a leg portion mounted on a floor panel, a seat cushion frame slidably mounted on the leg portion, and a load reinforcing structure connected between the leg portion and the seat cushion frame, wherein when a seat belt anchorage load is transferred to the seat cushion frame, the seat cushion frame is locked to the leg portion by the load reinforcing structure.

19 Claims, 7 Drawing Sheets

(56) References Cited

U.S. PATENT DOCUMENTS

| | | | | |
|---|---|---|---|---|
| 5,106,144 A * | 4/1992 | Hayakawa | ............ | B60N 2/0818 |
| | | | | 297/216.1 X |
| 5,226,697 A * | 7/1993 | Borlinghaus | ........... | B60R 22/26 |
| | | | | 297/216.18 X |
| 5,653,506 A * | 8/1997 | Wisner | ................. | B60N 2/0707 |
| | | | | 297/216.1 X |
| 5,755,422 A * | 5/1998 | Susko | .................... | B60N 2/073 |
| | | | | 248/430 |
| 6,089,665 A * | 7/2000 | Andrigo | ................... | B60N 2/06 |
| | | | | 297/216.15 X |
| 6,352,312 B1 * | 3/2002 | Rees | ...................... | B60N 2/072 |
| | | | | 297/216.16 |
| 6,786,543 B2 * | 9/2004 | Andersson | ............. | B60N 2/433 |
| | | | | 297/216.13 X |
| 7,195,311 B2 * | 3/2007 | Kuliha | ................. | B60N 2/0715 |
| | | | | 297/216.15 |
| 8,038,210 B2 * | 10/2011 | Telesco | ................. | B60N 2/502 |
| | | | | 297/216.19 |
| 8,998,325 B2 * | 4/2015 | Jonsson | ............ | B60N 2/42709 |
| | | | | 297/216.19 |
| 9,579,997 B2 * | 2/2017 | Eckhoff | ............... | B60N 2/4256 |
| 10,118,506 B2 * | 11/2018 | Hattori | ................... | B60N 2/073 |
| 10,406,943 B2 * | 9/2019 | Hayashi | ................. | B60R 22/26 |

* cited by examiner

VEHICLE SEAT REINFORCEMENT DEVICE

CROSS-REFERENCE TO RELATED APPLICATION

The present application claims priority to Korean Patent Application No. 10-2022-0115759 filed on Sep. 14, 2022, the entire contents of which is incorporated herein for all purposes by this reference.

BACKGROUND OF THE PRESENT DISCLOSURE

Field of the Present Disclosure

The present disclosure relates to a vehicle seat reinforcement device, and more, a vehicle seat reinforcement device configured for preventing a seat cushion frame, which is connected to a leg portion by a sliding structure, and thus vulnerable, in terms of strength, to an impact applied to a seat belt or the like during a vehicle collision, from being deformed.

Description of Related Art

In general, a configuration for wearing a vehicle seat belt includes a retractor mounted at a predetermined position on a vehicle body for locking and pulling the seat belt, an anchor mounted on the vehicle body to guide the seat belt drawn out of the retractor toward a passenger, a tongue fastened to the seat belt, a buckle mounted on the seat cushion frame, and the like.

When a passenger pulls the tongue to a desired position for wearing the seat belt, the seat belt is drawn out of the retractor via the anchor, and the tongue is inserted and locked into the buckle, completing the seat belt wearing.

Accordingly, the seat belt locking function of the retractor is exhibited in case of a sudden vehicle stop or a collision accident, preventing a phenomenon in which the body of a passenger wearing the seat belt is sharply tilted forward thereof.

At the present time, when passenger's body load, which is rapidly applied forward due to a vehicle crash, etc., acts on the seat belt, the locked state of the tongue of the seat belt into the buckle and the mounted state of the buckle on the seat cushion frame should be maintained as it is.

In other words, because the passenger's body load acting on the seat belt may be transmitted to the tongue and the buckle, not only the locking strength between the tongue and the buckle, but also the mounting strength of the buckle on the seat cushion frame should be maintained at a certain level or more.

Meanwhile, a seat belt anchorage test, which is a kind of safety test of a seat belt, is conventionally performed to check the mounting strength of a buckle on a seat cushion frame.

The seat belt anchorage test is a test that checks whether the buckle combined with the tongue of the seat belt remains mounted on the seat cushion frame without being separated from the seat cushion frame under the load (seat belt anchorage load) applied to the seat belt by the human body model which is accommodated on seats having various specifications in a fastened state by the seat belt when the human body model is artificially pulled forward to simulate a crash accident.

For reference, the seat belt anchorage load refers to a passenger's body load acting on the seat belt due to a vehicle collision accident, etc.

However, as a result of carrying out the seat belt anchorage test for various vehicle seats having various specifications, among various vehicle seat types, unlike a vehicle seat type in which a seat cushion frame with a movable rail mounted on the bottom thereof is fastened to a floor panel with a fixed rail mounted thereon so that the movable rail is movable forwards and backwards along the fixed rail, in a vehicle seat type in which a seat cushion frame is directly mounted on a leg portion mounted on a floor panel, there is a problem in that the seat cushion frame on which a buckle is mounted is deformed and separated from the leg portion due to the seat belt anchorage load.

In other words, among various vehicle seat types, in the vehicle seat type in which the seat cushion frame is mounted directly on the leg portion mounted on the floor panel, there is a problem in that when the passenger's body load acting on the seat belt due to a vehicle collision accident, that is, the seat belt anchorage load, is transferred to the seat cushion frame through the combined tongue and buckle, the buckle may be maintained mounted on the seat cushion frame without being separated from the seat cushion frame, but rather, deformation such as the seat cushion frame being separated from the leg portion occurs.

Furthermore, when the passenger's body load acting on the seatbelt, that is, the seat belt anchorage load, is transferred to the seat cushion frame through the combined tongue and buckle due to a vehicle collision accident, if the seat cushion frame is deformed so that for example, the seat cushion frame is separated from the leg portion, the buckle mounted on the seat cushion frame is also out of position, so that a passenger cannot be protected by the seat belt and may be moved in the direction in which the inertial force acts, resulting in a problem in that the injury to the passenger is inevitably increased.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle seat reinforcement device in which a leg portion for supporting a seat cushion frame is mounted on a floor panel, a seat cushion frame with a buckle mounted thereon is mounted on the leg portion by a sliding structure, resulting in weakness in strength, and a load reinforcing structure is connected between the leg portion and the seat cushion frame to solve the strength reduction, so that even when a passenger's body load acting on a seat belt, that is, a seat belt anchorage load, is transferred to the seat cushion frame through a combined tongue and buckle due to a vehicle collision accident, the deformation phenomenon that for example, the seat cushion frame is separated from the leg portion may be easily prevented by the load reinforcing structure.

In one aspect of the present disclosure, a vehicle seat reinforcement device includes: a leg portion mounted on a floor panel; a seat cushion frame slidably mounted on the leg portion; and a load reinforcing structure connected between the leg portion and the seat cushion frame, wherein when a seat belt anchorage load is transferred to the seat cushion frame, the seat cushion frame is locked to the leg portion by the load reinforcing structure.

In various exemplary embodiments of the present disclosure, the load reinforcing structure may include: a transverse pipe connected to rear side plates of the seat cushion frame therebetween; a support wire mounted on the transverse pipe; and a support bracket including a lower end portion mounted on the leg portion, and an upper end portion with a hook portion into which the support wire is inserted and locked.

In an exemplary embodiment of the present disclosure, the support wire may have a rectangular ring shape with an upper end portion mounted on the transverse pipe by welding.

In an exemplary embodiment of the present disclosure, the support bracket may include: a first support bracket including a first lower plate mounted on the leg portion, a first upper plate vertically bent from the first lower plate, and a first hook formed integrally with an upper portion of the first upper plate and into which the support wire is inserted; and a second support bracket including a second lower plate mounted on the leg portion, a second upper plate vertically bent from the second lower plate, and a second hook formed integrally with an upper portion of the second upper plate and into which the support wire is inserted.

The first lower plate and the second lower plate may be mounted on the leg portion by welding or bolting.

Furthermore, in a state in which the first and second upper plates are in contact with each other and the first hook and the second hook are also in contact with each other while being opened forward, the support wire may be inserted into the first hook and the second hook in a lockable manner.

In various exemplary embodiments of the present disclosure, the load reinforcing structure may include: a transverse pipe connected to rear side plates of the seat cushion frame therebetween; a support bracket including an upper end portion mounted on the transverse pipe and a lower end portion with a hook portion; and a support wire mounted on the leg portion and inserted and locked into the hook portion.

In an exemplary embodiment of the present disclosure, the support wire may have a rectangular ring shape with a lower end portion mounted on the leg portion by welding.

In an exemplary embodiment of the present disclosure, the support bracket may include: a first support bracket including an upper end portion with a first groove portion in contact with the transverse pipe and a lower end portion with a first hook into which the support wire is inserted; and a second support bracket including an upper end portion with a second groove portion in contact with the transverse pipe and a lower end portion with a second hook into which the support wire is inserted.

The first groove portion and the second groove portion may be in close contact with and mounted on the transverse pipe by welding.

Furthermore, in a state in which the first hook and the second hook with which the first support bracket and the second support bracket are in contact are in close contact with each other while being opened rearward thereof, the support wire may be inserted into the first hook and the second hook in a lockable manner.

In various exemplary embodiments of the present disclosure, the load reinforcing structure may include: a transverse pipe connected to rear side plates of the seat cushion frame therebetween; a support wire mounted on the transverse pipe; and a support bracket including a front end portion and a rear end portion mounted on the leg portion, and a sliding hole between the front end portion and the rear end portion and into which the support wire is inserted to be movable forwards and backwards and to be lockable.

In an exemplary embodiment of the present disclosure, the support wire may have a rectangular ring shape with an upper end portion mounted on the transverse pipe by welding.

In an exemplary embodiment of the present disclosure, the support bracket may include: a front plate and a rear plate spaced apart in a front and rear direction from each other and mounted on the leg portion; and a connection plate integrally connected between the front plate and the rear plate with the sliding hole formed at a bottom portion thereof.

The front plate and the rear plate of the support bracket may be in close contact with and mounted on the leg portion by bolting.

Furthermore, the front and rear length of the sliding hole may be formed to be the same as the maximum forward or backward distance of the support wire moving forward or backward together with the seat cushion frame.

The present disclosure has the following effects through the above means for solving the problems.

First, in case where the leg portion mounted on the floor panel and the seat cushion frame with the buckle mounted thereon are coupled by the sliding structure, resulting in weakness in strength, the load reinforcing structure is connected between the leg portion and the seat cushion frame to solve the strength reduction, so that even when a passenger's body load acting on the seat belt is transferred to the seat cushion frame through the combined tongue and buckle due to a vehicle collision accident, the seat cushion frame is locked to the leg portion by the load reinforcing structure, easily preventing a deformation phenomenon that for example, the seat cushion frame is separated from the leg portion.

Second, even when a passenger's body load acting on the seat belt is transferred to the seat cushion frame through the combined tongue and buckle due to a vehicle collision accident, due to the load reinforcing structure, the seat cushion frame cannot be deformed and maintain the state of being mounted on the leg portion as it is, preventing injury to the passenger occurring due to the deformation of the seat cushion frame upon a collision accident.

Third, even when a passenger's body load acting on the seat belt is transferred to the seat cushion frame through the combined tongue and buckle due to a vehicle collision accident, due to the load reinforcing structure, the seat cushion frame cannot be deformed and maintain the state of being mounted on the leg portion as it is, so that the buckle mounted on the seat cushion frame also maintains its position, and accordingly, a passenger can normally maintain his or her seat belt-fastened state.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Referring to FIGS. 1, 4, 5 and 6, a seat cushion frame 20 is mounted on a leg portion 10 mounted on a floor panel to be movable forwards and backwards by a sliding structure 40.

That is, a sliding guide bracket 41 including a sliding hole 42 is mounted on the leg portion 10 and a sliding pin 43 is formed on the seat cushion frame 20 so that the sliding pin 43 is inserted into and slides along the sliding hole 42 of the sliding guide bracket 41. Accordingly, the seat cushion frame 20 is mounted on the leg portion 10 to be movable forwards and backwards thereof.

However, when the leg portion 10 and the seat cushion frame 20 are connected by the sliding structure 40 as above, the seat cushion frame 20 may be weakened in terms of strength.

Practically, the strength of a rear-side lateral portion of the seat cushion frame 20 connected to the leg portion 10 by the sliding structure 40 may be reduced.

Therefore, when the seat belt anchorage load is transferred to the seat cushion frame through a tongue and a buckle due to a vehicle collision accident, although the buckle may be maintained mounted on the seat cushion frame without being separated from the seat cushion frame, there is a problem that the seat cushion frame may be deformed so that for example, the seat cushion frame is separated from the leg portion.

In the structure in which the seat cushion frame 20 is mounted on the leg portion 10 mounted on the floor panel to be movable forwards and backwards by the sliding structure 40, the present disclosure provides the load reinforcing structure between the leg portion and the rear end portion of the seat cushion frame to solve the above problem, so that even when a passenger's body load acting on the seat belt is transferred to the seat cushion frame through the combined tongue and buckle due to a vehicle collision accident, the seat cushion frame is locked to the leg portion by the load reinforcing structure, easily preventing a deformation phenomenon that for example, the seat cushion frame is separated from the leg portion.

Hereinafter, various exemplary embodiments of the present disclosure will be described in detail.

First Exemplary Embodiment

Figure 1:
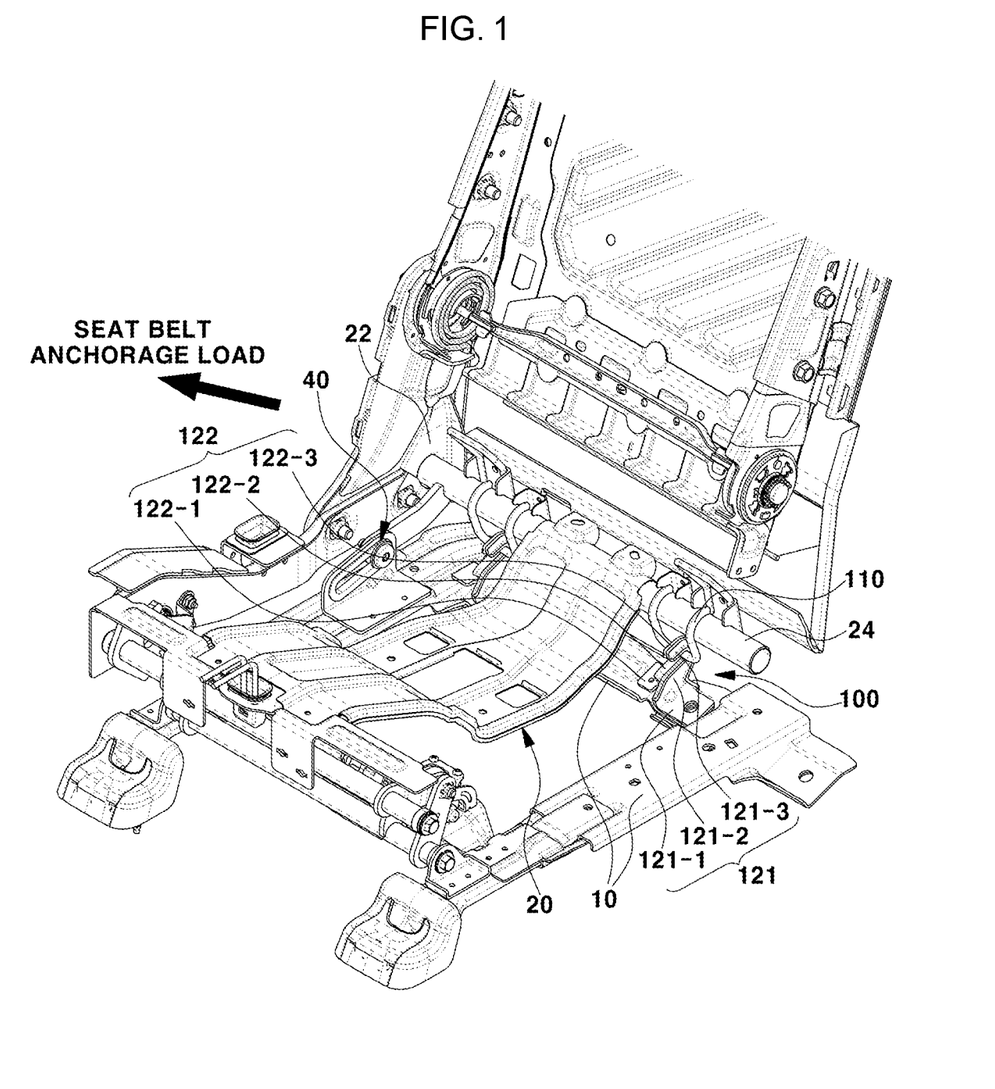
FIG. 1 is a perspective view exemplarily illustrating a vehicle seat reinforcement device according to various exemplary embodiments of the present disclosure.
Figure 2:
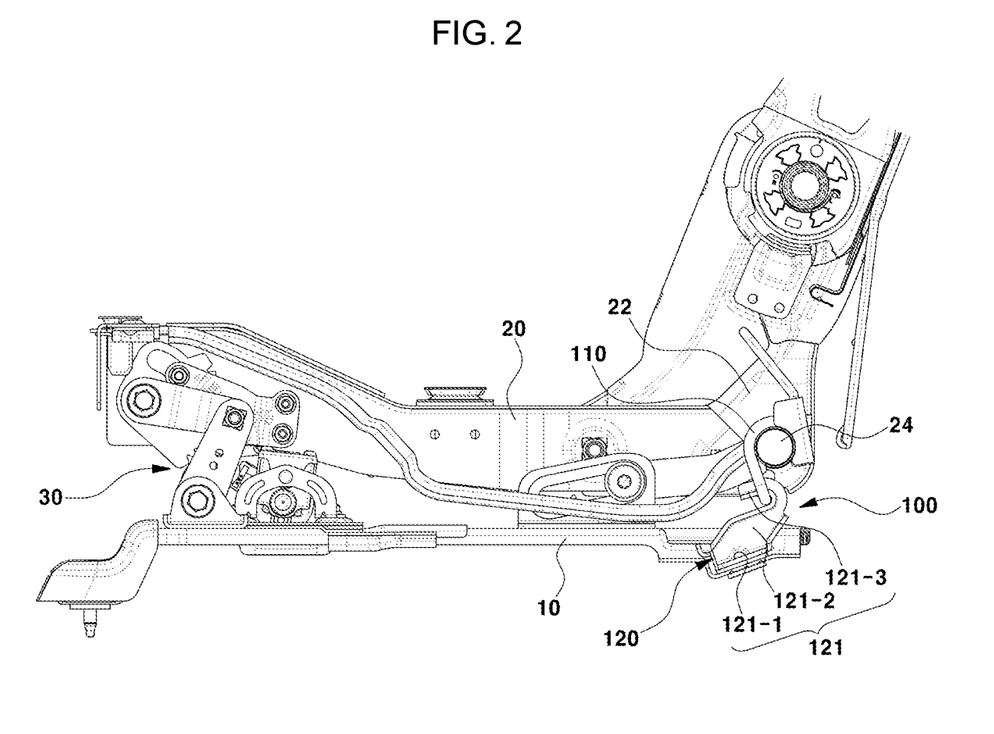
FIG. 2 is a side view exemplarily illustrating the vehicle seat reinforcement device according to the various exemplary embodiments of the present disclosure.
Figure 3:
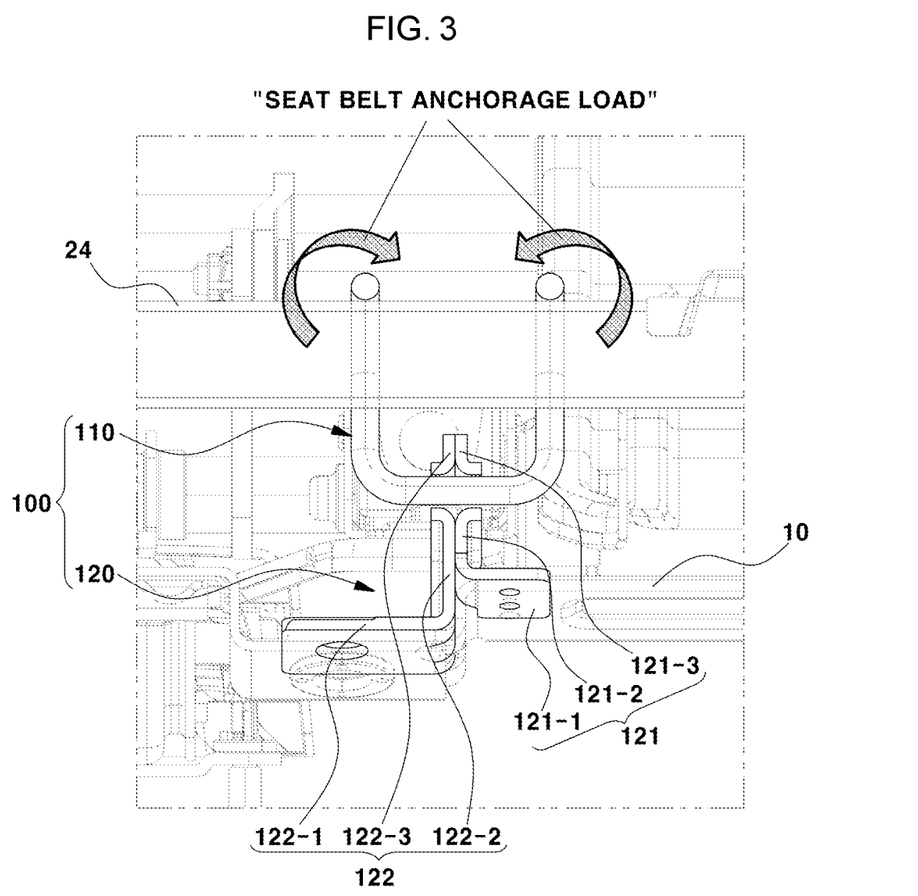
FIG. 3 is a bottom view exemplarily illustrating the vehicle seat reinforcement device according to the various exemplary embodiments of the present disclosure.

FIGS. 1, 2, and 3 are diagrams illustrating a vehicle seat reinforcement device according to a first exemplary embodiment of the present disclosure, in which reference numeral 10 denotes a leg portion.

The leg portion 10 is configured as both a mounting site and a support for a seat cushion frame 20 for a rear seat, and may be integrally mounted on a floor panel in an interior of a vehicle by welding or bolting.

The seat cushion frame 20 is a skeleton of the rear seat cushion with the bottom mounted on the leg portion 10 by bolting or the like.

Here, a buckle for fastening a tongue of the seat belt may be mounted on one side of the seat cushion frame 20.

In a vehicle seat type in which the seat cushion frame 20 is mounted directly on the leg portion 10 mounted on the floor panel as described above, when a passenger's body load acting on the seat belt, i.e., a seat belt anchorage load, is transferred to the seat cushion frame through the tongue and the buckle due to a vehicle collision accident, although the buckle may be maintained mounted on the seat cushion frame without being separated from the seat cushion frame, there may be a problem that the seat cushion frame 20 may be deformed so that for example, the seat cushion frame 20 is separated from the leg portion 10.

According to a first exemplary embodiment of the present disclosure, a load reinforcing structure 100 is connected between the seat cushion frame 20 and the leg portion 10 to prevent a deformation phenomenon that, for example, the seat cushion frame 20 is separated from the leg portion 10 due to the seat belt anchorage load.

Accordingly, when the seat belt anchorage load is transferred to the seat cushion frame 20, the seat cushion frame 20 may be locked to the leg portion 10 by the load reinforcing structure 100, preventing a deformation phenomenon that, for example, the seat cushion frame 20 is separated from the leg portion 10.

To the present end, as illustrated in FIG. 1, FIG. 2, and FIG. 3, the load reinforcing structure 100 according to the first exemplary embodiment of the present disclosure may include a transverse pipe 24 connected between rear side plates 22 of the seat cushion frame 20, a support wire 110 mounted on the transverse pipe 24, and a support bracket 120 mounted on the leg portion 10 and including hook portions 121-3 and 122-3 into which the support wire 110 is inserted in a lockable manner.

Here, a lower end portion of the support bracket 120 may be mounted on the leg portion 10, and an upper end portion of the support bracket 120 may be provided with the hook portions 121-3 and 122-3 into which the support wire 110 is inserted in a lockable manner.

The support wire 110 may have a rectangular ring shape with an upper end portion mounted on the transverse pipe 24 by welding.

The support bracket 120 according to the first exemplary embodiment may include a first support bracket 121 and a second support bracket 122 that are in close contact with each other, to distribute the load on the leg portion 10 and to increase the coupling strength with the leg portion 10, as well as to prevent a rear end portion of the seat cushion frame 20 from being deformed while being separated in one or the other direction due to the transfer direction of the seat belt anchorage load to the seat cushion frame 20 being different.

In other words, the support bracket 120 may include the first support bracket 121 for preventing the rear end portion of the seat cushion frame 20 from being deformed while being separated in one direction due to the transfer direction of the seat belt anchorage load to the seat cushion frame 20 being different, and the second support bracket 122 for preventing the rear end portion of the seat cushion frame 20 from being deformed while being separated in the other direction due to the transfer direction of the seat belt anchorage load to the seat cushion frame 20 being different.

To the present end, the first support bracket 121 may include a first lower plate 121-1 mounted on the leg portion 10, a first upper plate 121-2 vertically bent from the first lower plate 121-1, and a first hook 121-3 integrally formed on an upper portion of the first upper plate 121-2 and into which the support wire 110 is inserted. Furthermore, the second support bracket 122 may include a second lower plate 122-1 mounted on the leg portion 10, a second upper plate 122-2 vertically bent from the second lower plate 122-1, and a second hook 122-3 integrally formed on an upper portion of the second upper plate 122-2 and into which the support wire 110 is inserted.

The first lower plate 121-1 and the second lower plate 121-1 may be mounted on the leg portion 10 by welding or bolting, so that the first support bracket 121 and the second support bracket 122 may be firmly mounted on the leg portion 10.

Here, when the first lower plate 121-1 and the second lower plate 121-1 are mounted on the leg portion 10 by welding or bolting, the first upper plate 121-2 and the second upper plate 122-2 are brought into close contact with each other, and at the same time, the first hook 121-3 and the second hook 122-3 are also brought into close contact with each other while being opened forward thereof.

Furthermore, when the first lower plate 121-1 and the second lower plate 121-1 are mounted on the leg portion 10 by welding or bolting, the support wire 110 is in a state of being inserted into the first hook 121-3 and the second hook 122-3 in a lockable manner.

On the other hand, a sliding and tilting mechanism 30 may be mounted between the seat cushion frame 20 and the leg portion 10 to allow the support wire 110 to move at the same time when the seat cushion frame 20 slides forward, so that the support wire 110 may be separated from the first hook 121-3 and the second hook 122-3.

Accordingly, to easily prevent the support wire 110 from being separated from the first hook 121-3 and the second hook 122-3, the front and rear length of the first hook 121-3 and the second hook 122-3 may be further increased depending on a distance along which the seat cushion frame 20 slides forward as indicated by the dotted line box and arrow in FIG. 2.

Therefore, although upon the transfer of the seat belt anchorage load to the seat cushion frame 20 through the tongue and the buckle, a seat belt anchorage load provided as a pulling force acting on one side or the other side is applied to the transverse pipe 24 of the seat cushion frame 20 as indicated by the arrow in FIG. 3, the support wire 110 mounted on the transverse pipe 24 of the seat cushion frame 20 is caught by respective hooks 121-3 and 122-3 of the first and second support brackets 121 and 122 mounted on the leg portion 10 and maintained in a locked state, easily preventing a deformation phenomenon that for example, the seat cushion frame 20 is separated from the leg portion 10.

Accordingly, according to the first exemplary embodiment of the present disclosure, even when a passenger's body load acting on the seat belt, i.e., a seat belt anchorage load, is transferred to the seat cushion frame 20 through the tongue and the buckle due to a vehicle collision accident, the seat cushion frame 20 is in a state of being locked to the leg portion 10 by the load reinforcing structure 100, easily preventing a deformation phenomenon that for example, the seat cushion frame 20 is separated from the leg portion 10.

Furthermore, even when a passenger's body load acting on the seat belt, i.e., a seat belt anchorage load, is transferred to the seat cushion frame through the tongue and the buckle due to a vehicle collision accident, due to the load reinforcing structure 100, the seat cushion frame 20 cannot be deformed and maintain the state of being mounted on the leg portion 10 as it is, so that the buckle mounted on the seat cushion frame 20 also maintains its position, and accordingly, a passenger can normally maintain his or her seat belt-fastened state.

Second Exemplary Embodiment

Figure 4:
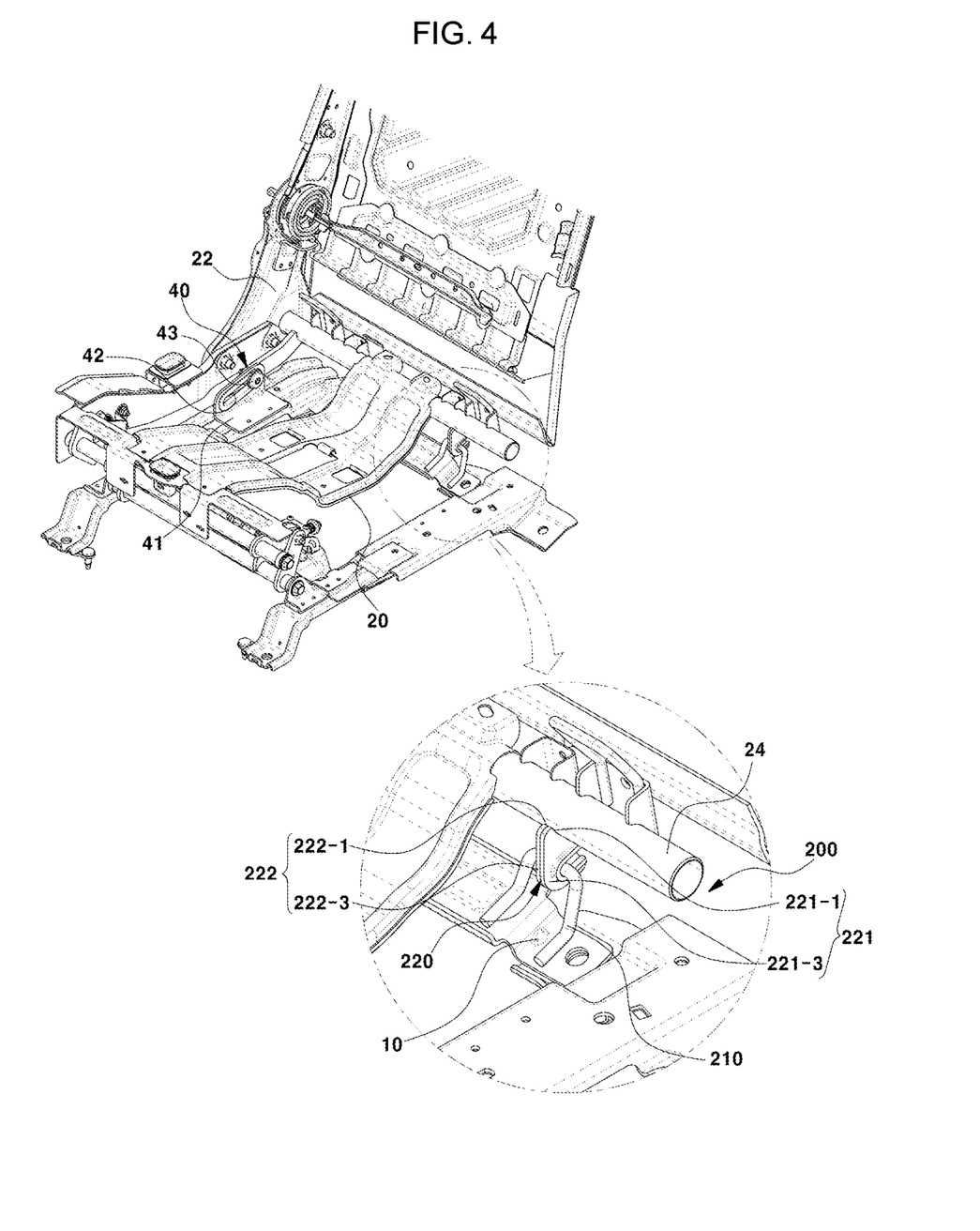
FIG. 4 is a perspective view exemplarily illustrating a vehicle seat reinforcement device according to various exemplary embodiments of the present disclosure.
Figure 5:
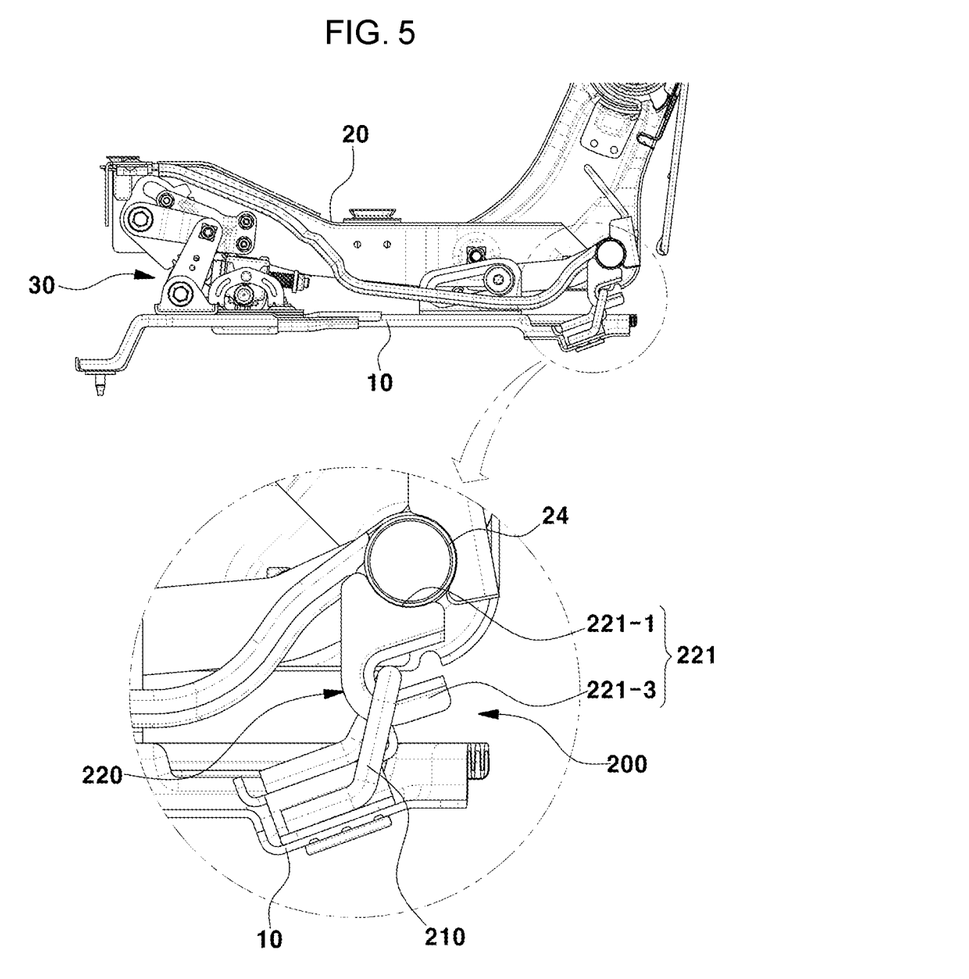
FIG. 5 is a side view exemplarily illustrating the vehicle seat reinforcement device according to the various exemplary embodiments of the present disclosure.

FIG. 4 and FIG. 5 are diagrams illustrating a vehicle seat reinforcement device according to a second exemplary embodiment of the present disclosure, in which reference numeral 10 denotes a leg portion.

The leg portion 10 is configured as both a mounting site and a support for a seat cushion frame 20 for a rear seat, and may be integrally mounted on a floor panel in an interior of a vehicle by welding or bolting.

The seat cushion frame 20 is a skeleton of the rear seat cushion with the bottom mounted on the leg portion 10 by bolting or the like.

Here, a buckle for fastening a tongue of the seat belt may be mounted on one side of the seat cushion frame 20.

According to a second exemplary embodiment of the present disclosure, a load reinforcing structure 200 is connected between the seat cushion frame 20 and the leg portion 10 to prevent a deformation phenomenon that, for example, the seat cushion frame 20 is separated from the leg portion 10 due to the seat belt anchorage load.

The load reinforcing structure 200 according to the second exemplary embodiment is characterized in that the shape and mounting position of the support wire and the support bracket are different from those of the first exemplary embodiment.

To the present end, as illustrated in FIG. 4 and FIG. 5, the load reinforcing structure 200 according to the second exemplary embodiment of the present disclosure may include a transverse pipe 24 connected between rear side plates 22 of the seat cushion frame 20, a support wire 210 mounted on the leg portion 10, and a support bracket 220 mounted on the transverse pipe 24 and including hook portions 221-3 and 222-3 into which the support wire 210 is inserted in a lockable manner.

Here, an upper end portion of the support bracket 220 may be mounted on the transverse pipe 24, and a lower end portion of the support bracket 220 may be provided with the hook portions 221-3 and 222-3 into which the support wire 210 is inserted in a lockable manner.

The support wire 210 may have a rectangular ring shape with a lower end portion mounted on the leg portion 10 by welding.

The support bracket 220 according to the second exemplary embodiment may include a first support bracket 221 and a second support bracket 222 that are in close contact with each other, to distribute the load on the leg portion 10 and to increase the coupling strength with the leg portion 10, as well as to prevent a rear end portion of the seat cushion frame 20 from being deformed while being separated in one or the other direction due to the transfer direction of the seat belt anchorage load to the seat cushion frame 20 being different.

To the present end, the first support bracket 221 may have an upper end portion with a first groove portion 221-1 in close contact with the transverse pipe 24 and a lower end portion with a first hook 221-3 into which the support wire 210 is inserted. Furthermore, the second support bracket 222 may have an upper end portion with a second groove portion 222-1 in close contact with the transverse pipe 24 and a lower end portion with a second hook 222-3 into which the support wire 210 is inserted.

The first groove portion 221-1 and the second groove portion 222-1 may be in close contact with and mounted on an external circumferential surface of the transverse pipe 24 by welding, so that the first support bracket 221 and the second support bracket 222 may be firmly fixed to the transverse pipe 24.

At the present time, when the first groove portion 221-1 and the second groove portion 222-1 are mounted on the transverse pipe 24 by welding, the first support bracket 221 and the second support bracket 222 are in close contact with each other, and at the same time, the first hook 221-3 and the second hook 222-3 are opened rearward thereof.

Furthermore, when the first groove portion 221-1 and the second groove portion 222-1 are mounted on the transverse pipe 24 by welding, the support wire 210 is in a state of being inserted into the first hook 221-3 and the second hook 222-3 in a lockable manner.

On the other hand, a sliding and tilting mechanism 30 may be mounted between the seat cushion frame 20 and the leg portion 10 to allow the first and second support brackets 221 and 222 to move at the same time when the seat cushion frame 20 slides forward, so that the support wire 210 mounted on the leg portion 10 may be separated from the first hook 221-3 and the second hook 222-3.

Accordingly, to easily prevent the support wire 210 from being separated from the first hook 221-3 and the second hook 222-3, the front and rear length of the first hook 221-3 and the second hook 222-3 may be further increased depending on a distance along which the seat cushion frame 20 slides forward as indicated by the dotted line box and arrow in FIG. 5.

Therefore, although upon the transfer of the seat belt anchorage load to the seat cushion frame 20 through the tongue and the buckle, a seat belt anchorage load provided as a pulling force acting on one side or the other side is applied to the transverse pipe 24 of the seat cushion frame 20, the support wire 210 mounted on the leg portion 10 is caught by respective hooks 221-3 and 222-3 of the first and second support brackets 221 and 222 mounted on the transverse pipe 24 and maintained in a locked state, easily preventing a deformation phenomenon that for example, the seat cushion frame 20 is separated from the leg portion 10.

Accordingly, according to the second exemplary embodiment of the present disclosure, even when a passenger's body load acting on the seat belt, i.e., a seat belt anchorage load, is transferred to the seat cushion frame 20 through the tongue and the buckle due to a vehicle collision accident, the seat cushion frame 20 is in a state of being locked to the leg portion 10 by the load reinforcing structure 200, easily preventing a deformation phenomenon that for example, the seat cushion frame 20 is separated from the leg portion 10.

Furthermore, even when a passenger's body load acting on the seat belt, i.e., a seat belt anchorage load, is transferred to the seat cushion frame through the tongue and the buckle due to a vehicle collision accident, due to the load reinforcing structure 200, the seat cushion frame 20 cannot be deformed and maintain the state of being mounted on the leg portion 10 as it is, so that the buckle mounted on the seat cushion frame 20 also maintains its position, and accordingly, a passenger can normally maintain his or her seat belt-fastened state.

Third Exemplary Embodiment

Figure 6:
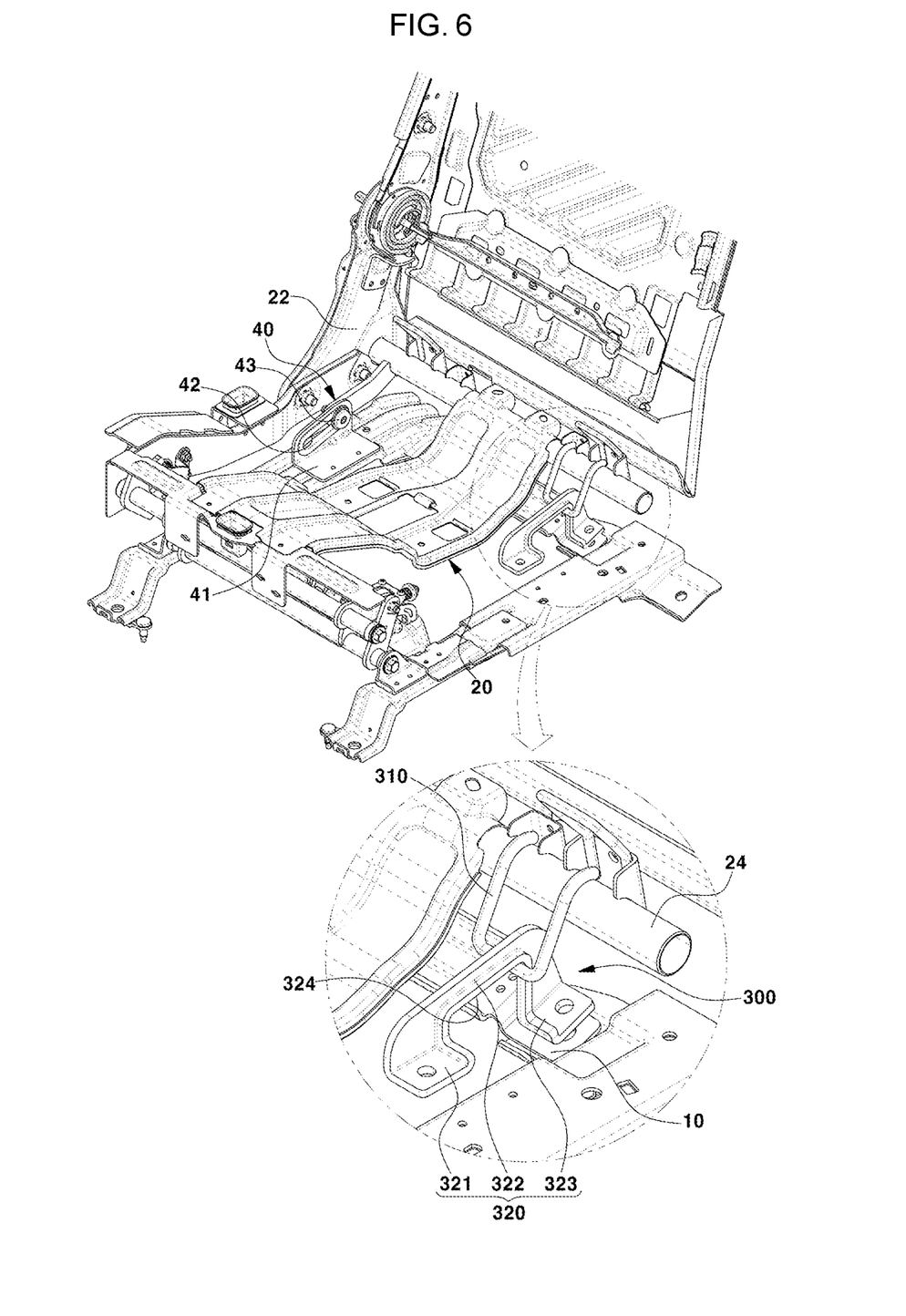
FIG. 6 is a perspective view exemplarily illustrating a vehicle seat reinforcement device according to various exemplary embodiments of the present disclosure.
Figure 7:
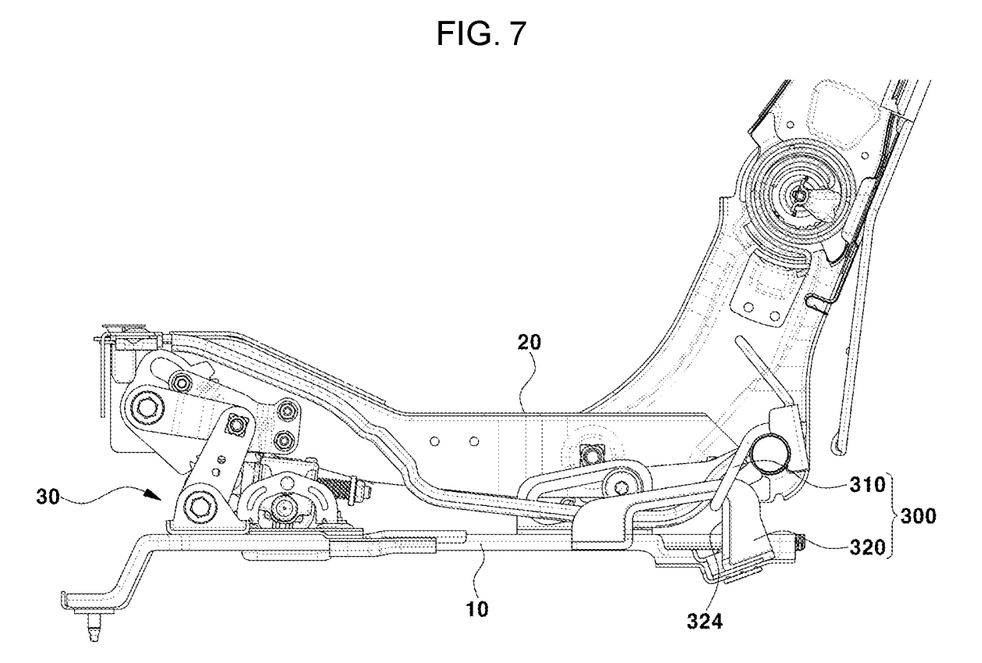
FIG. 7 is a side view exemplarily illustrating the state in which a seat cushion frame is not yet moved forward in the vehicle seat reinforcement device according to the various exemplary embodiments of the present disclosure.
Figure 8:
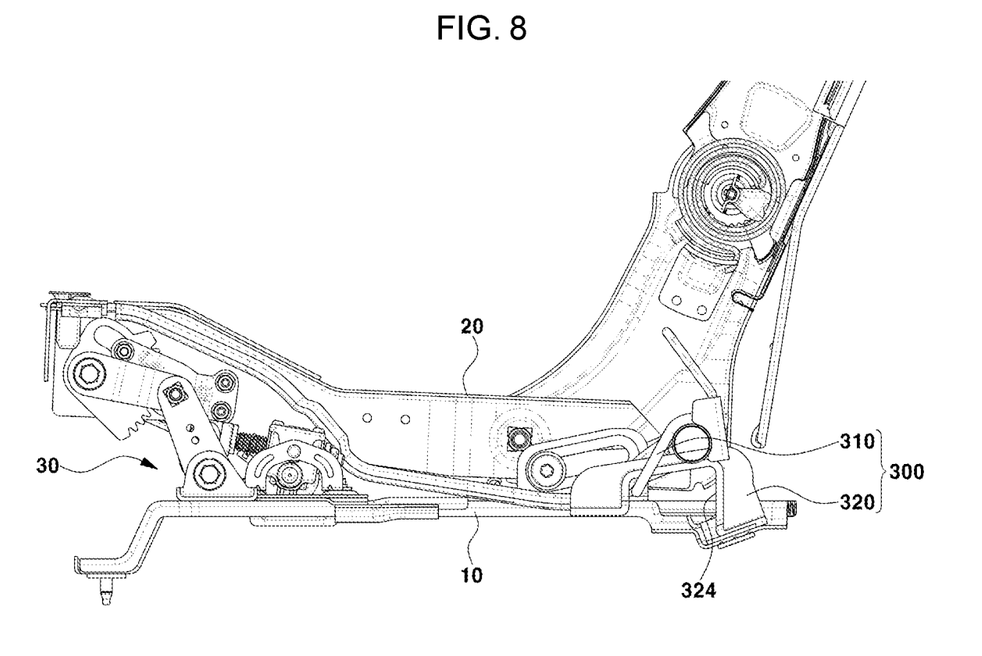
FIG. 8 is a side view exemplarily illustrating the state in which a seat cushion frame is moved forward in the vehicle seat reinforcement device according to the various exemplary embodiments of the present disclosure.

FIG. 6, FIG. 7, and FIG. 8 are diagrams illustrating a vehicle seat reinforcement device according to a third exemplary embodiment of the present disclosure, in which reference numeral 10 denotes a leg portion.

The leg portion 10 is configured as both a mounting site and a support for a seat cushion frame 20 for a rear seat, and may be integrally mounted on a floor panel in an interior of a vehicle by welding or bolting.

The seat cushion frame 20 is a skeleton of the rear seat cushion with the bottom mounted on the leg portion 10 by bolting or the like.

Here, a buckle for fastening a tongue of the seat belt may be mounted on one side of the seat cushion frame 20.

According to a third exemplary embodiment of the present disclosure, a load reinforcing structure 300 is connected between the seat cushion frame 20 and the leg portion 10 to prevent a deformation phenomenon that, for example, the seat cushion frame 20 is separated from the leg portion 10 due to the seat belt anchorage load.

The load reinforcing structure 300 according to the third exemplary embodiment is characterized in that the support wire may be completely prevented from being separated through the support bracket when the seat cushion frame slides forwards and backwards thereof, compared to the first and second exemplary embodiments.

To the present end, as illustrated in FIGS. 6 to 8, the load reinforcing structure 300 according to the third exemplary embodiment of the present disclosure may include a transverse pipe 24 connected between rear side plates 22 of the seat cushion frame 20, a support wire 310 mounted on the transverse pipe 24, and a support bracket 320 mounted on the leg portion 10 and including a sliding hole 324 into which the support wire 310 is inserted to be movable forwards and backwards and in a lockable manner.

The support wire 310 may have a rectangular ring shape with an upper end portion mounted on the transverse pipe 24 by welding.

The support bracket 320 according to the third exemplary embodiment of the present disclosure may include a front plate 321 and a rear plate 323 that are spaced from each other and mounted on the leg portion 10, and a connection plate 322 integrally connected between the front plate 321 and the rear plate 323. The bottom portion of the connection plate 322 is provided with a sliding hole 324 into which the support wire 310 is inserted to be movable forwards and backwards and in a lockable manner.

The front and rear length of the sliding hole 324 may be provided to be the same as the full movement stroke, i.e., the maximum forward or backward movement distance, of the support wire 310 that moves forward or backward together with the seat cushion frame 20, so that upon forward or backward movement of the seat cushion frame 20, the forwards and backwards movement and the locked state of the support wire 310 may be secured.

At the present time, because the front plate 321 and the rear plate 323 are closely attached to and mounted on the leg portion 10 by bolting, the support bracket 320 may be firmly fixed to the leg portion 10.

Furthermore, when the front plate 321 and the rear plate 323 are closely attached to and bolted to the leg portion 10, the support wire 310 is inserted in advance into the sliding hole 324 in a locked state, so that the support wire 310 may be in a state of being inserted into the sliding hole 324 to be movable forwards and backwards and in a lockable manner.

Accordingly, when the seat cushion frame 20 slides forward by the forward/backward sliding and tilting mechanism 30 mounted between the seat cushion frame 20 and the leg portion 10 and the support wire 310 mounted on the transverse pipe 24 is moved at the same time, the support wire 310 may be easily moved along the sliding hole 324 without being easily separated therefrom.

For example, before the seat cushion frame 20 slides forward, as illustrated in FIG. 7, the support wire 310 mounted on the transverse pipe 24 may be located at the rearmost portion in a section of the sliding hole 324 of the support bracket 320. Furthermore, after the seat cushion frame 20 slides forward, as illustrated in FIG. 8, the support wire 310 mounted on the transverse pipe 24 may be located at the foremost portion in the section of the sliding hole 324 of the support bracket 320.

Similarly, although upon the transfer of the seat belt anchorage load to the seat cushion frame 20 through the tongue and the buckle, a seat belt anchorage load provided as a pulling force acting on one side or the other side is applied to the transverse pipe 24 of the seat cushion frame 20, the support wire 310 mounted on the transverse pipe 24 of the seat cushion frame 20 is caught in the sliding hole 324 of the support bracket 320 mounted on the leg portion 10 and maintained in a locked state, easily preventing a deformation phenomenon that for example, the seat cushion frame 20 is separated from the leg portion 10.

Accordingly, according to the third exemplary embodiment of the present disclosure, even when a passenger's body load acting on the seat belt, i.e., a seat belt anchorage load, is transferred to the seat cushion frame 20 through the tongue and the buckle due to a vehicle collision accident, the seat cushion frame 20 is in a state of being locked to the leg portion 10 by the load reinforcing structure 300, easily preventing a deformation phenomenon that for example, the seat cushion frame 20 is separated from the leg portion 10.

Furthermore, even when a passenger's body load acting on the seat belt, i.e., a seat belt anchorage load, is transferred to the seat cushion frame through the tongue and the buckle due to a vehicle collision accident, due to the load reinforcing structure 300, the seat cushion frame 20 cannot be deformed and maintain the state of being mounted on the leg portion 10 as it is, so that the buckle mounted on the seat cushion frame 20 also maintains its position, and accordingly, a passenger can normally maintain his or her seat belt-fastened state.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle seat reinforcement apparatus comprising:
   a leg portion mounted on a floor panel;
   a seat cushion frame slidably mounted on the leg portion to be movable forwards and backwards by a sliding structure; and
   a load reinforcing structure connected between the leg portion and the seat cushion frame and including:
      at least one support wire connected to one of the seat cushion frame and the leg portion; and
      at least one support bracket connected to the other of the seat cushion frame and the leg portion and lockably caught to the other,
   wherein when a seat belt anchorage load is transferred to the seat cushion frame, the seat cushion frame is locked to the leg portion by the load reinforcing structure so that the seat cushion frame is prevented from being separated from the leg portion.

2. The vehicle seat reinforcement apparatus of claim 1, wherein the load reinforcing structure further includes:
   a transverse pipe connected to rear side plates of the seat cushion frame therebetween;
   the at least one support wire mounted on the transverse pipe; and
   the at least one support bracket including a lower end portion mounted on the leg portion, and an upper end portion with a hook portion into which the at least one support wire is inserted and locked.

3. The vehicle seat reinforcement apparatus of claim 2, wherein the at least one support bracket includes a pair of support brackets, each including the lower end portion mounted on the leg portion, and the upper end portion with the hook portion into which the at least one support wire is inserted and locked.

4. The vehicle seat reinforcement apparatus of claim 3, wherein the pair of support brackets includes:
- a first support bracket including a first lower plate mounted on the leg portion, a first upper plate vertically bent from the first lower plate, and a first hook formed integrally with an upper portion of the first upper plate and into which the at least one support wire is inserted; and
- a second support bracket including a second lower plate mounted on the leg portion, a second upper plate vertically bent from the second lower plate, and a second hook formed integrally with an upper portion of the second upper plate and into which the at least one support wire is inserted.

5. The vehicle seat reinforcement apparatus of claim 2, wherein the at least one support wire has a rectangular ring shape with an upper end portion thereof mounted on the transverse pipe by welding.

6. The vehicle seat reinforcement apparatus of claim 5, wherein the first lower plate and the second lower plate are mounted on the leg portion by welding or bolting.

7. The vehicle seat reinforcement apparatus of claim 5, wherein in a state in which the first and second upper plates are in contact with each other and the first hook and the second hook are also in contact with each other while being opened forward, the at least one support wire is inserted into and locked to the first hook and the second hook.

8. The vehicle seat reinforcement apparatus of claim 1, wherein the load reinforcing structure includes:
- a transverse pipe connected to rear side plates of the seat cushion frame therebetween;
- the at least one support bracket including an upper end portion mounted on the transverse pipe and a lower end portion with a hook portion; and
- the at least one support wire mounted on the leg portion and inserted and locked into the hook portion.

9. The vehicle seat reinforcement apparatus of claim 8, wherein the at least one support bracket includes a pair of support brackets, each including the upper end portion mounted on the transverse pipe and the lower end portion with the hook portion.

10. The vehicle seat reinforcement apparatus of claim 9, wherein the pair of support brackets includes:
- a first support bracket including an upper end portion with a first groove portion in contact with the transverse pipe and a lower end portion with a first hook into which the at least one support wire is inserted; and
- a second support bracket including an upper end portion with a second groove portion in contact with the transverse pipe and a lower end portion with a second hook into which the at least one support wire is inserted.

11. The vehicle seat reinforcement apparatus of claim 10, wherein the first groove portion and the second groove portion are in contact with and mounted on the transverse pipe by welding.

12. The vehicle seat reinforcement apparatus of claim 10, wherein in a state in which the first hook and the second hook with which the first support bracket and the second support bracket are in contact are in contact with each other while being opened rearward thereof, the at least one support wire is inserted into and locked to the first hook and the second hook.

13. The vehicle seat reinforcement apparatus of claim 8, wherein the at least one support wire has a rectangular ring shape with a lower end portion mounted on the leg portion by welding.

14. The vehicle seat reinforcement apparatus of claim 1, wherein the load reinforcing structure includes:
- a transverse pipe connected to rear side plates of the seat cushion frame therebetween;
- the at least one support wire mounted on the transverse pipe; and
- the at least one support bracket including a front end portion and a rear end portion mounted on the leg portion, and a sliding hole between the front end portion and the rear end portion and into which the at least one support wire is inserted to be movable forwards and backwards and to be lockable.

15. The vehicle seat reinforcement apparatus of claim 14, wherein the at least one support bracket includes a pair of support brackets, each including the front end portion and the rear end portion mounted on the leg portion, and the sliding hole between the front end portion and the rear end portion and into which the at least one support wire is inserted to be movable forwards and backwards and to be lockable.

16. The vehicle seat reinforcement apparatus of claim 15, wherein the at least one support wire has a rectangular ring shape with an upper end portion thereof mounted on the transverse pipe by welding.

17. The vehicle seat reinforcement apparatus of claim 15, wherein the pair of support brackets includes:
- a front plate and a rear plate spaced apart in a front and rear direction from each other and mounted on the leg portion; and
- a connection plate integrally connected between the front plate and the rear plate with the sliding hole formed at a bottom portion thereof.

18. The vehicle seat reinforcement apparatus of claim 17, wherein the front plate and the rear plate of the support brackets are in contact with and mounted on the leg portion by bolting.

19. The vehicle seat reinforcement apparatus of claim 17, wherein a front and rear length of the sliding hole is formed to be the same as a maximum forward or backward distance of the at least one support wire moving forward or backward together with the seat cushion frame.

* * * * *